(12) United States Patent
Maleki et al.

(10) Patent No.: US 6,455,194 B1
(45) Date of Patent: Sep. 24, 2002

(54) LITHIUM-ION BATTERY ELECTRODE COMPOSITION

(75) Inventors: Hossein Maleki; Guoping Deng; Anaba Anani, all of Lawrenceville; Inna Kerzhner-Haller, Auburn, all of GA (US)

(73) Assignee: Motorola Inc., Schaumburg, IL (US)

( * ) Notice: Subject to any disclaimer, the term of this patent is extended or adjusted under 35 U.S.C. 154(b) by 108 days.

(21) Appl. No.: 09/728,804

(22) Filed: Dec. 2, 2000

Related U.S. Application Data

(60) Provisional application No. 60/182,080, filed on Feb. 11, 2000.

(51) Int. Cl.$^7$ ................. H01M 04/62; H01M 04/88
(52) U.S. Cl. ................. 429/217; 429/212; 429/231.95; 252/182.1
(58) Field of Search ................. 429/217, 213, 429/212, 231.95, 231.9, 218.1; 252/182.1

(56) References Cited

U.S. PATENT DOCUMENTS

| | | | | |
|---|---|---|---|---|
| 4,775,455 A | * | 10/1988 | Chandramouli et al. | 204/294 |
| 6,350,542 B1 | * | 2/2002 | Gan et al. | 429/215 |
| 2001/0051300 A1 | * | 12/2001 | Moriguchi et al. | 429/231.8 |

\* cited by examiner

*Primary Examiner*—Patrick Ryan
*Assistant Examiner*—R Alejandro
(74) *Attorney, Agent, or Firm*—Philip H. Burrus, IV

(57) ABSTRACT

A lithium-ion battery having at least an anode that includes phenol formaldehyde in a range of 0.1% to 10% by weight as a binder material. The phenol formaldehyde, or a mixture of phenol formaldehyde with polyvinylidene fluoride (PVDF), is used as a binding material in a Li-ion battery negative electrode to decrease the exothermic reaction of the battery during charging and discharging, which accordingly lessens the risk of thermal runaway and rupture of the battery.

6 Claims, 1 Drawing Sheet

LITHIUM-ION BATTERY ELECTRODE COMPOSITION

CROSS-REFERENCE TO RELATED APPLICATIONS

This application claims priority from U.S. Provisional Application Ser. No. 60/182,080, filed Feb. 11, 2000, the disclosures of which, including all attached documents and appendices, are incorporated by reference in their entirety for all purposes.

TECHNICAL FIELD

This invention relates generally to rechargeable batteries and their construction. More particularly, the present invention relates to a composition for an electrode of a lithium-ion battery that has a low exothermic reaction to create a more reliable Li-ion battery.

BACKGROUND

As the term is used in electrochemistry, a battery is any of a class of devices that convert chemical energy directly into electrical energy. The mechanism by which a battery generates an electric current involves the arrangement of constituent chemicals in such a manner that electrons are released from one part of the battery and made to flow through an external circuit to another part. The part of the battery at which the electrons are released to the circuit is called the anode, or the negative electrode, and the part of the battery that receives the electrons from the circuit is known as the cathode, or the positive electrode. Some batteries, known as "rechargeable" batteries, are constructed such that a reverse current applied to the electrodes causes the battery to recharge and hold a new capacity to discharge.

One of the most common rechargeable batteries is a lithium-ion battery. Conventional negative electrodes (or anodes) in rechargeable Li-ion batteries contain active conductive materials such as hard carbons, graphite, or MCMB, with polyvinylidene fluoride (PVDF) as a "binder" material.

The electrochemical reaction in a Li-ion battery is exothermic and thus the battery generates heat in both the charge and discharge cycle. Further, significant exothermic heat generation occurs in the Li-ion battery under abusive conditions, such as a short circuit, overcharging, over-discharging, and operation at high temperatures. The exothermic heat generation is attributed to a combination of effects including the reaction of the PVDF in the electrodes with "lithiated" carbon, reaction of electrolyte with oxygen liberated due to decomposition of positive electrode (cathode) material, and breakdown of the electrodes passivation layers. Insufficient heat dissipation in the Li-ion battery can compromise the performance of the battery and may result in the release of combustible gasses at high temperatures, known as "thermal runaway".

Accordingly, the minimization of the exothermic heat generation from the electrochemical operation of the Li-ion battery is desirable because increasing the reliability of the battery decreases the likelihood that the battery will suffer from thermal runaway and rupture. It is thus to the provision of such a battery having an electrode composition that has minimal exothermic heat generation during electrical charge and discharge of the battery that the present invention is primarily directed.

DETAILED DESCRIPTION OF THE INVENTION

Figure 1:
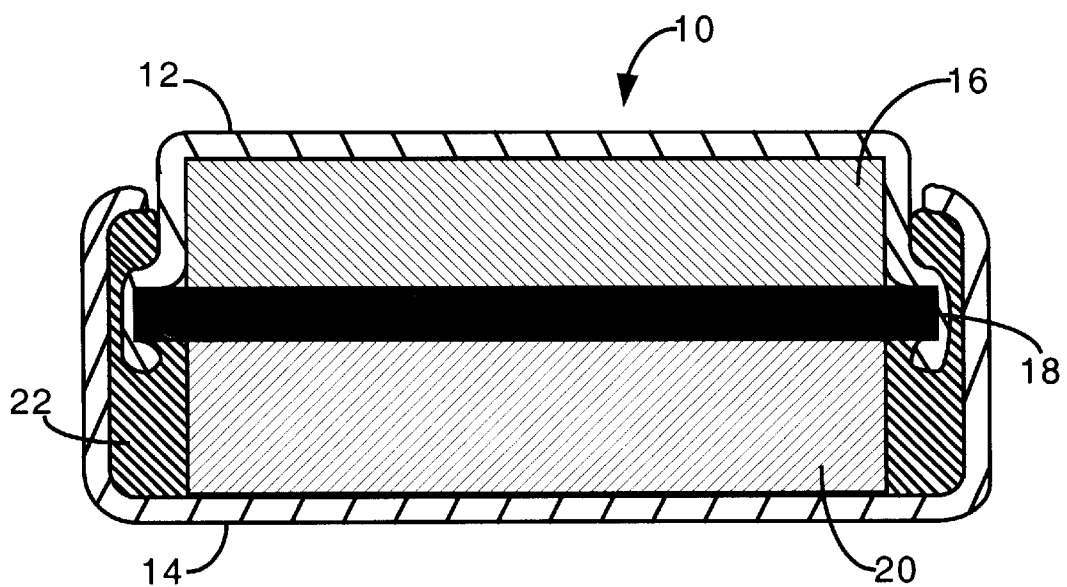
FIG. 1 is an exemplary embodiment of a lithium-ion battery with the anode and cathode in a coin-on-coin configuration in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

With reference to FIG. 1, there is illustrated a lithium-ion battery 10 having electrodes in a coin-on-coin configuration. The battery 10 has an upper component 12 and a lower component 14, which are constructed of one or more conductive materials. Within the upper component 12 is an anode 16, and within lower component 14 is a cathode 20, with separator 18 between anode 16 and cathode 20. The insulator 22 insures that the anode 16 is only in conductive connection with the upper component 12, and the cathode 20 is in conductive connection with the lower component 14 whereby conductive contact with both the upper component 12 and lower component 14 will close a circuit and allow current to flow due to the electrochemical reaction of the anode 16 and cathode 20. The coin-on-coin Li-ion battery configuration and other electrode and component configurations are well known in the art and the present inventive battery can be readily configured to any type of Li-ion or Li-polymer battery as would be apparent to one of skill in the art.

The present invention provides an alternative binder material for use in the composition of at least the anode 16 of a Li-ion battery. Alternately, the binder material can be used in the cathode of the battery. While conventional Li-ion batteries use polyvinylidene fluoride (PVDF) as a binder for the conductive elements of the negative electrode, the present invention uses phenol formaldehyde (PF) as the binder ingredient at least in the negative electrode (and alternately the cathode) in a range of 0.1% to 10% by weight, either as the sole binder or in mixture with PVDF. The use of PF as the binder lessens the exothermic reaction in the battery from the electrochemical reaction. And most importantly, the heat generation of the negative electrode is independent of the degree of lithiation.

Electrochemical cells that are assembled with PF as a component of the anode binder exhibit a lower self-heating rate than cells solely using PVDF as the binder material in the anode. As is more fully shown herein, even under abusive and fully lithiated conditions, the battery with the PF anode exhibits reduced heat generation when compared to electrodes with the typical PVDF binder. In addition, the electrode formulation results in battery cells with higher thermal stability with minimal, if any, consequences to cell performance in voltage and cycling characteristics.

The experimental cells used to verify the efficacy of the present invention were constructed as follows. For the construction of the half cell electrodes, a solvent, SFG44 graphite, and either PVDF or PF binder were mixed for 3 minutes to form a slurry which was then coated on a conductive substrate. The coating was then cured under a vacuum at 100° C. and allowed to sit for 12 hours. Then the coated substrate was heated to 700° C. for 4 hours. The single cells were comprised of an anode 16 and cathode 20, where the anode 16 is comprised of SFG44 and MCMB in a 50/50 mixture with either PF at 5% by weight and PVDF at 3% by weight, or PF at 6.5% by weight and PVDF at 1.5% by weight, and the mixture included a solvent. The cathode 20 included LiNiO2 and PVDF at 1.5% by weight and PF at 2.5% by weight, with a solvent. Each of the compositions were mixed for 3 minutes and then coated upon a substrate and calendared. The coated substrate was heated to 100° C. under a vacuum for 12 hours. If pre-carbonization of the electrodes were desired, it could be performed at this stage, prior to the electrodes being placed in an electrochemical cell.

The SFG44 Negative Electrode Containing Phenol Formaldehyde electrode was lithiated at current density of 0.4 mA/cm2 (equivalent to C/10) to 0.005 V, followed by tapering current to C/30. The delithiation was carried to 2.0 V at C/5 rate. Table 1 illustrates a 1st cycle efficiency and a 2nd cycle reversible capacity comparison for the negative electrodes containing SFG44 graphite in half-cell configuration.

TABLE 1

| Anodes | 1st Cycle Efficiency (%) | Reversible Capacity mA/g) | Binder |
|---|---|---|---|
| SFG44 | 87.5 | 336 | PVDF Binder |
| SFG44 | 83.0 | 300 | Phenol Formaldehyde |

Comparison of DSC spectra for fully lithiated SFG44 electrodes containing solely PVDF binder (8.0% by weight) and pre-carbonized PF binder (8.0% by weight), and of SPG44/MCMB electrode made with PVDF (8.0% by weight), PVDF (3.0%by weight)-PF (5% by weight), or PVDF (1.5% by weight)-PF (6.5% by weight), revealed in each instance, that anodes having only PVDF binder exhibited higher heat generation. Thus, the results show that heat generation in the negative electrode (anode) is primarily due to the reaction of lithiated carbon with PVDF, and also that heat generation increases with an increasing content of PVDF binder in the anode. Conversely, the heat generation of cells with PF-containing negative electrodes remained substantially constant regardless of the extent of lithiation. Therefore, the inclusion of PF into the anode will give the cell increased thermal stability and will lessen the risk of thermal runaway.

To illustrate the invention on a full battery cell, full T-cells were constructed with the negative electrode containing SFG44/MCMB in a 50/50 mixture, and PF/PVDF mixture binder materials. The positive electrode (cathode) is constructed with LiNiO2, a Li-paste electrolyte (LiPF6 in 40:30:30 EC:DEC:DMC) as known in the art, and a glass-fiber separator. The binder in the cathode is PVDF at 1.5% by weight and PF at 2.5% by weight, and the binder in the anode is PVDF 3% by weight and PF at 5% by weight.

The T-cells were cycled at 1.0 mA/cm2 charge rate and 2.0 mA/cm2 discharge rate. All of the cells demonstrate 62% first cycle efficiency and cathode capacity utilization of 112 mAh/g. Thus, the charge and discharge rates are almost identical to the cell with anode consisting solely of PVDF.

Lithium-ion polymer cells were likewise constructed with the same combination of elements in the positive and negative electrodes as the T-cells. Table 2 summarizes the cell performance when cycled by charging at 250 mA to 4.1 V, and tapering at constant 4.1 V to 20 mA, and discharging at 500 mA to 3.0 V cut-off.

TABLE 2

| Cell | Binder in the Anode | 1st Cycle Efficiency (%) | 5th Cycle Discharge Capacity (mAh) |
|---|---|---|---|
| FN54101–FN54103 | PVDF, Phenol Formaldehyde | 62.4 | 529 |
| FN49915–FN49921 | PVDF | 62.2 | 535 |

As can be seen in Table 2, the efficiency and discharge capacity between the cells with PVDF anode and PVDF/PF anode are negligible. Therefore, the safety benefit of the inclusion of PF in the anode does not significantly adversely effect the performance of the fully assembled cell. The cycle efficiency and cell capacity are similar in the T-cells and polymer cells containing the same positive/negative electrode material.

The thermal runaway profile of the polymer cell having a PF binder is significantly less than a typical cell without any PF binder. Accelerated rate calorimeter (ARC) experiments reveal that the self-heating rate profile of a standard polymer cell, e.g. LiNiO2 mixture with no PF as a binder material, is exponential from the onset of thermal runaway until cell rupture. When the polymer cell is embodied with the anode containing a binder mixture of 5% by weight of PF and 3% by weight of PVDF, the cell begin to experience thermal runaway at the same onset temperature, but reaches a maximum self-heating rate and then the self-heating rate decreases to almost 0. Consequently, while both cells undergo thermal runaway at about the same temperature, the cell having PF in the binder of the anode stabilizes and does not exponentially heat until cell rupture. Thus, the PF binder would be especially advantageous in providing a safer Li-ion battery that is routinely subjected to abusive conditions, such as extremes of ambient heat.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

What is claimed is:

1. A lithium-ion battery having at least one anode and at least one cathode, wherein at least the anode includes phenol formaldehyde in a range of 0.1% to 10% by weight.

2. The battery of claim 1, wherein the cathode includes phenol formaldehyde in a range of 0.1% to 10% by weight.

3. The battery of claim 1, wherein the anode is comprised of graphite, and includes phenol formaldehyde at 8% by weight as a binder.

4. The battery of claim 1, wherein the anode further includes polyvinylidene fluoride (PVDF).

5. The battery of claim 4, wherein the anode includes phenol formaldehyde at 6.5% by weight and polyvinylidene fluoride at 1.5% by weight.

6. The battery of claim 4, wherein the anode includes phenol formaldehyde at 5% by weight and polyvinylidene fluoride at 3% by weight.

* * * * *